No. 742,601. PATENTED OCT. 27, 1903.
J. H. CROSKEY.
GLASS FINISHING APPARATUS.
APPLICATION FILED APR. 24, 1903.
NO MODEL. 4 SHEETS—SHEET 3.
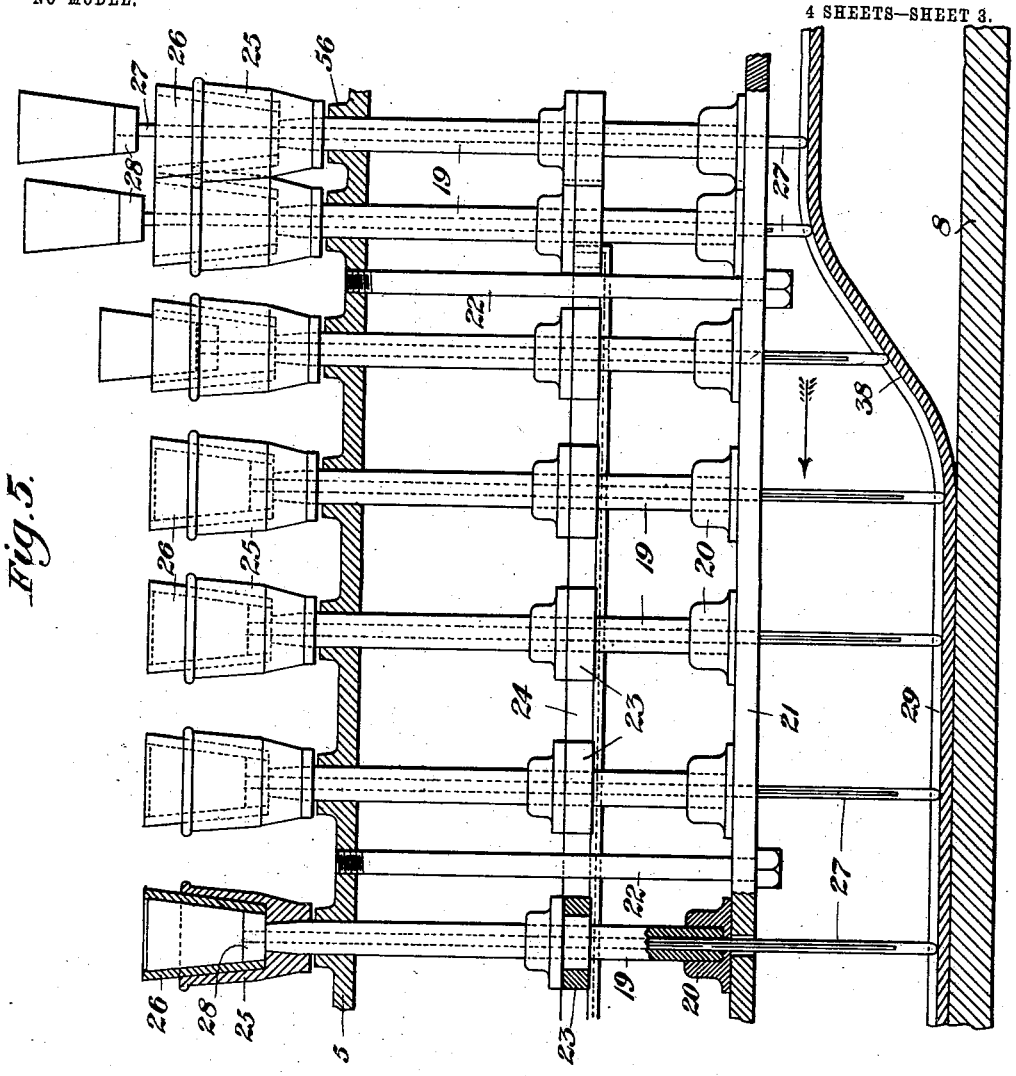
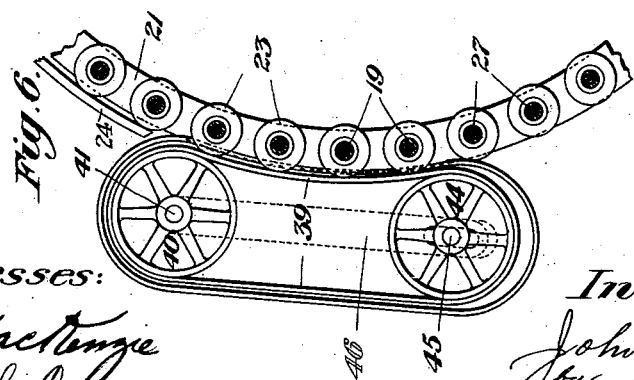
Witnesses: Inventor.
John H. Croskey
by C. M. Clarke
his Attorney.

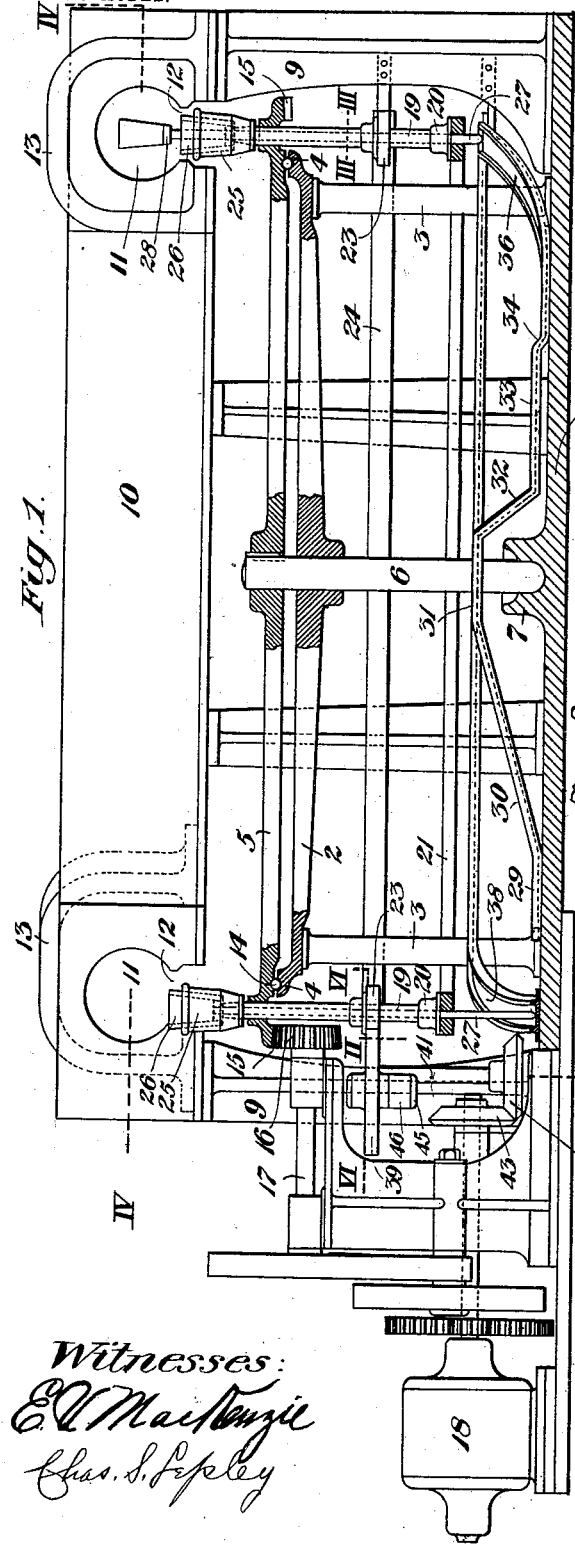

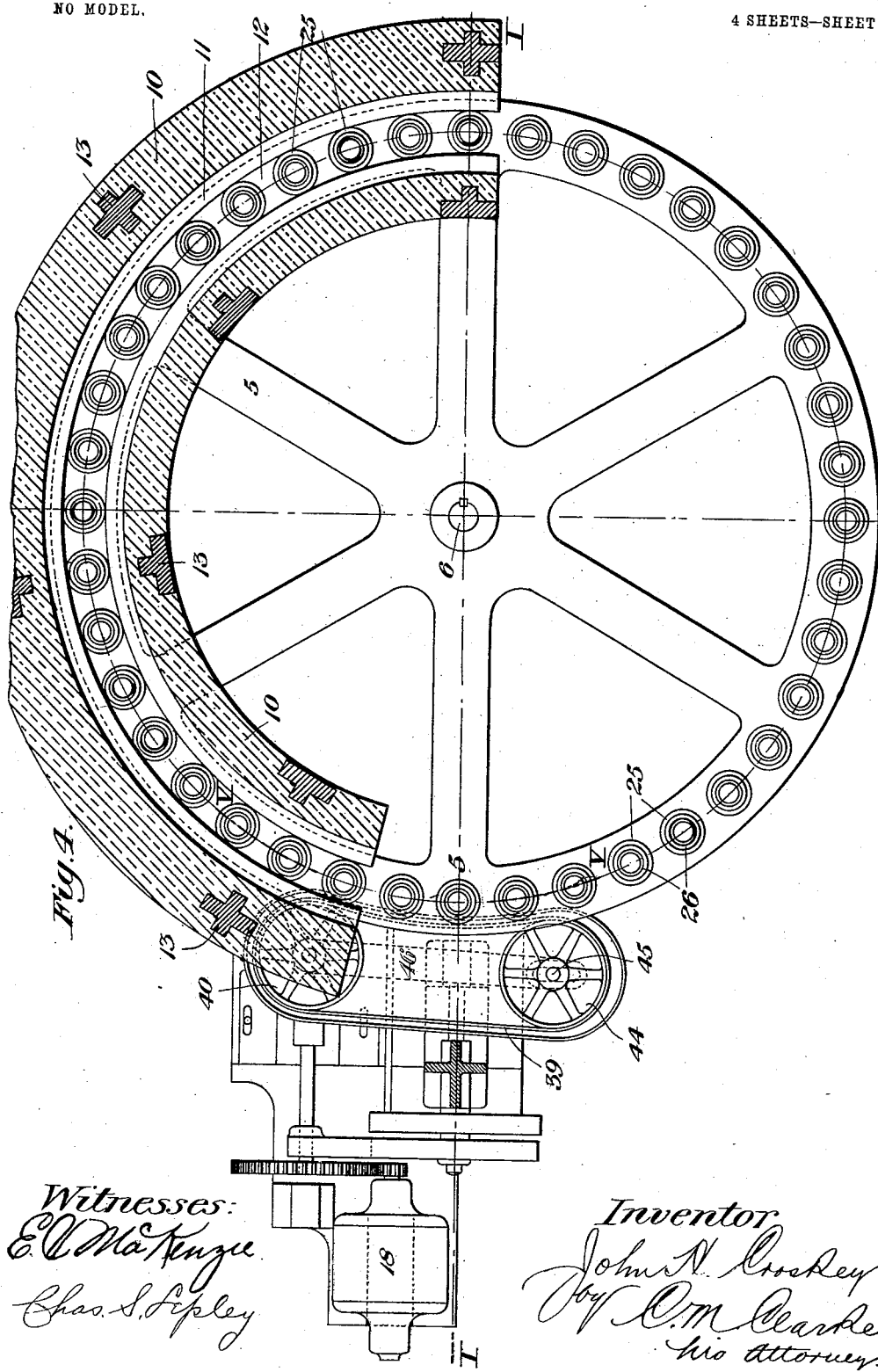

No. 742,601. PATENTED OCT. 27, 1903.
J. H. CROSKEY.
GLASS FINISHING APPARATUS.
APPLICATION FILED APR. 24, 1903.
NO MODEL. 4 SHEETS—SHEET 4.

Witnesses:
E. L. MacKenzie
Chas. S. Sepley

Inventor:
John H. Croskey
by C. M. Clarke
his Attorney.

No. 742,601.       Patented October 27, 1903.

UNITED STATES PATENT OFFICE.

JOHN H. CROSKEY, OF PITTSBURG, PENNSYLVANIA.

GLASS-FINISHING APPARATUS.

SPECIFICATION forming part of Letters Patent No. 742,601, dated October 27, 1903.

Application filed April 24, 1903. Serial No. 154,040. (No model.)

*To all whom it may concern:*

Be it known that I, JOHN H. CROSKEY, a citizen of the United States, residing at Pittsburg, in the county of Allegheny and State of Pennsylvania, have invented certain new and useful Improvements in Glass-Finishing Apparatus, of which the following is a specification, reference being had therein to the accompanying drawings, forming part thereof, in which—

Figure 7:
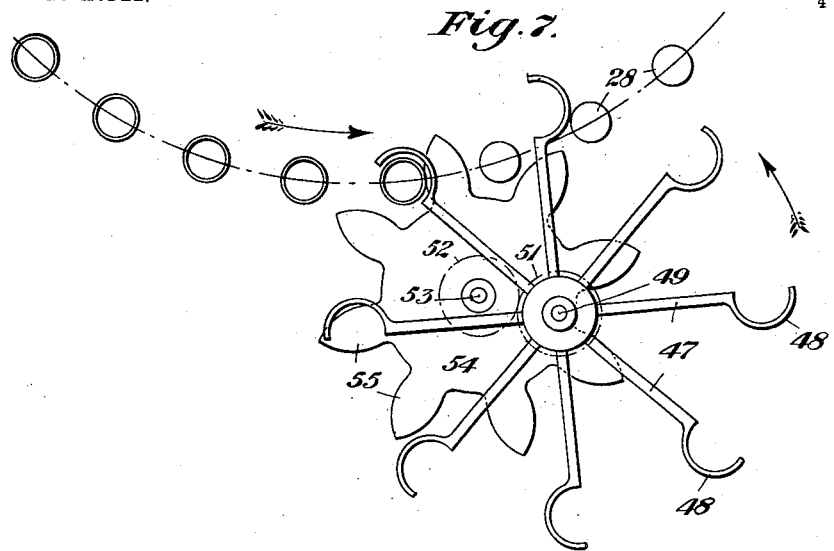
Figure 8:
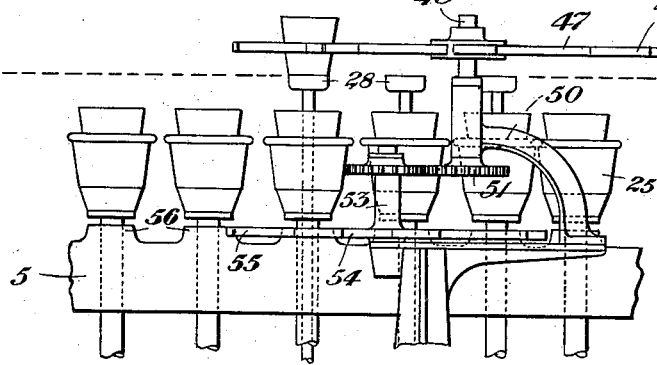
Figure 9:
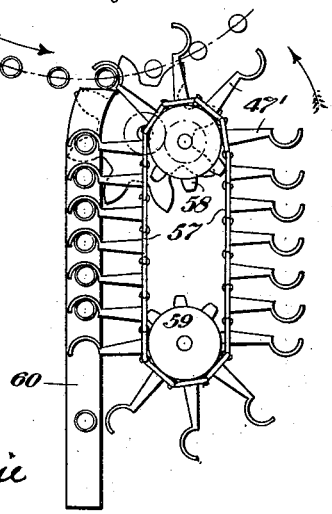

Figure 1 is a central vertical sectional view of my improved glass-finishing apparatus, taken on the line I I of Fig. 4, the cam-track, however, being shown in elevation and projecting in front of the central portion. Fig. 2 is a vertical sectional view indicated by the line II II of Fig. 1. Fig. 3 is a cross-section through one of the spindles on the line III III of Fig. 1. Fig. 4 is a plan view, the furnace being shown in section and indicated by the line IV IV of Fig. 1. Fig. 5 is a vertical sectional view on the line V V of Fig. 4. Fig. 6 is a detail sectional plan view on the line VI VI of Fig. 1, showing the means for rotating the spindles rapidly. Fig. 7 is a plan view of the discharging mechanism. Fig. 8 is a vertical sectional view thereof. Fig. 9 is a plan view showing a similar mechanism adapted to discharge the ware onto a carrier or slide.

My invention relates to apparatus for finishing pressed or blown glassware, such as tumblers; and it has for its object to perfectly fire-polish the article, to expose the surfaces of the ware to an even degree of heat to re-form it, to render the work of loading and unloading the apparatus simple and easy, and generally to produce a more satisfactory result and a better-finished ware at less cost and with less careful hand manipulation than is required at present.

Referring now to the drawings wherein the invention is illustrated, 2 is a stationary wheel mounted upon columns 3 and provided with a peripheral track or ball-race 4, adapted to support the rotating carrying-wheel 5. The carrying-wheel is keyed to a central spindle 6, having a bearing at the middle of the wheel 2 and resting at its lower end in a step-box 7, set upon or formed integral with the base-plate 8.

Mounted upon columns 9 or other suitable supporting means is the circularly-arranged furnace 10, having an interior heating-chamber 11 and a lower smaller opening-space 12, through which the ware is introduced to the interior or raised or lowered. The brickwork of the furnace is supported at intervals upon overhanging brackets 13; but such construction is well understood and does not *per se* form any part of the present invention.

The carrier 5 is rotatably mounted upon balls or roller-bearings 14, running in the race 4, and is provided with a peripheral series of teeth 15, into which gears a driving-pinion 16, mounted upon the inner end of shaft 17 and actuated, primarily, through suitable gearing from an electric motor 18 or other suitable source of power or prime mover.

Mounted in the outer portion of the carrier 5, beyond the supporting-bearings and inside of the peripheral rack 15, is a series of closely-adjacent rotating spindles 19, set in lower bearings 20, mounted on a depending ring 21, suspended from wheel 5 by supporting-arms 22, located at intervals between the spindle, as clearly shown in Fig. 5. The spindles 19 are each provided with friction-wheels 23, having peripheral bearings of vulcanized fiber or other suitable material and by which the spindles are rotated by frictional engagement against a stationary circular band 24, upon which the wheels 23 bear as the spindles are carried around by carrier 5.

On the top of each spindle 19 is mounted and secured a cup 25, in the inside of which is nested an inner changeable receiving-cup 26 for the ware. The inner cup is adapted to form the ware and is of varying interior shapes, as desired. It may be removed and other cups substituted and is also very easily cleaned or repaired.

The spindles 19 are provided with a central longitudinal channel or passage-way, in which is mounted an independent longitudinally-movable rod 27, having a spline or key engagement with the spindle, so that it will be rotated by it, and yet be free to be raised or lowered therein. Secured to the upper end of the stem 27 is a supporting-head 28, adapted to receive and support the ware when it is raised, as shown to the right of Fig. 5, and lower it into the inner cup 26, as shown at the left of said figure. Corresponding to the path of the spindles is a circular cam-track 29, having a gradually-inclined portion 30 at the front of the apparatus, a short level portion 31 of the maximum height, an abrupt downwardly-inclined portion 32, a horizontal portion 33 on a plane a little above the lowermost level, an abrupt drop 34, and a gradual incline 36 up to its highest level, which is then continued around through the entire length of the furnace to its outlet, the track there inclining down, as at 38, and leading into the lower horizontal level 29. The lower ends of the stems 27 travel upon this undulating track, rising and falling as controlled by the cam portion thereof and by gravity or traveling horizontally upon the level portions.

At one end of the apparatus is provided an endless driving-belt or carrier 39 of any suitable construction, as linked chains or belting, carried upon a driving-wheel 40, mounted on shaft 41, and driven by bevels 42 43 from the motor, the belt 39 passing around a supporting tightening-wheel 44, mounted upon an adjustable stud 45, carried on a swinging arm 46, by which the tension of the belt may be regulated and the location with relation to the driven wheels adjusted. The stationary band 24 is designed to impart a rotary motion to the spindles and to the ware at slow speed as it travels around through the furnace, the band 24 extending from the front of the furnace and terminating at the point of contact with belt 39, while the belt 39, being positively driven, engages the wheels 23 and rotates the spindles and the ware at a comparatively very high speed, which speed may be varied within wide limits, as desired. When the stem 27 reaches the bottom of incline 38 and the article of glassware has settled to the bottom, the ware is rapidly rotated, as described, the object of such rapid rotation being to expand the semiplastic glass outwardly against the interior smooth surface of the cup. By such rapid rotation the semiplastic glass is caused to press outwardly against the finished interior of the cup, and as such operation occurs immediately after the ware emerges downwardly from the furnace all inequalities are smoothed and the article is brought to a finished polished shape before cooling and will then cool without changing form. It will be understood that in its passage through the furnace the ware becomes very soft and is subject to such action, thereby causing it to easily assume a perfect form and giving it a perfectly-finished surface as it emerges from the furnace. As it travels around the horizontal track 29 the ware becomes cooled, and as the stems 27 rise upwardly on track 30 the ware is lifted upwardly above the cup to the same position, as shown at the right of Fig. 1, when it may be removed by the operator or by any suitable mechanical means, such as shown in Figs. 7, 8, and 9. A new tumbler or piece of ware is placed in the cup, resting on the head 28, while the spindle is on track 33, at which position the head 28 is not quite down to its lowermost position, but sufficiently near the bottom to permit the ware to be dropped into the cup. As the spindle progresses it will drop abruptly down the incline 34, when the ware will also drop, thus nesting snugly in the interior of the cup and centrally upon the supporting-head. After having become thus positively centered upon the head 28 the stem 27 gradually rises upon the inclined portion 36 of the track to the highest level, raising the tumbler, as shown in Fig. 1, into the heated furnace-chamber, through which it slowly travels around and in which it is slowly rotated by the frictional action of the band 24.

In Figs. 7 and 8 I have shown automatic carrying-wheels consisting of a series of rotating arms 47, provided with curved fingers 48, adapted to swing around on a central bearing-spindle 49 and to engage the ware as each piece comes into range. The spindle 49 is mounted in a suitable bracket 50 and has a pinion 51 secured to its lower end, with which engages a similar pinion 52, mounted on the upper end of the spindle 53. Said pinion 52 is rotated by means of a wheel 54, connected with the pinion and provided with teeth 55, adapted to be engaged by the spindle-bearing hubs 56 of the carrying-wheel 5. By this means as the wheel 5 progresses the arms 47 are rotated and each arm will sweep the article of ware off from the head 28 and onto a table or other top on the same level, (not shown in the drawings, but indicated by the line a a on Fig. 8,) from whence it may be removed, as desired.

If preferred, the ware may be taken off by means of the carrier (shown in Fig. 9,) wherein hooked arms 47' are secured to an endless belt or chain 57, actuated by a carrying-wheel 58 in the same manner already described. In this arrangement the belt 57 may be of any length and passed around a second carrying-wheel 59, the travel of the arms 47' being along the path of an inclined pan or chute 60, onto which the ware is thus conveyed and which may lead to any suitable point of discharge.

The operation will be readily understood from the foregoing description.

The apparatus is very efficient for the purpose intended and has a large carrying capacity, while each piece of ware is subjected to the same degree of heat and time exposure, resulting in very even and regular treatment.

The temperature of the furnace may be accurately regulated, as may also the speed of the different operations, and the entire apparatus is within the easy control of the operator. The fire-polishing and re-forming of the ware will impart to it a highly-finished uniform appearance, obliterating all inequalities and mold-marks, and thus producing the best quality of goods at a minimum of cost.

Changes and variations may be made in the construction, design, proportions, or other details by the skilled mechanic without departing from my invention, and all such changes are to be considered as within the scope of the following claims.

What I claim is—

1. In glass-finishing apparatus, the combination with a circularly-arranged furnace, of means for supporting and carrying the ware and means for raising and lowering it, and means for removing the finished ware, substantially as set forth.

2. In a glass-finishing furnace, the combination with a circularly-arranged furnace, of a series of vertically-reciprocating rotating ware-supporting spindles provided with friction-disks, and a stationary curved friction-band against which said disks bear to rotate the spindles in their travel through the furnace, substantially as set forth.

3. In glass-finishing apparatus, the combination with a furnace, of means for supporting and carrying the ware, means for raising and lowering it, and stationary and power-driven frictional means for rotating it, substantially as set forth.

4. In glass-finishing apparatus, the combination with a furnace, of means for supporting and carrying the ware, means for raising and lowering it, and stationary and power-driven frictional means for rotating it at varying speeds, substantially as set forth.

5. In glass-finishing apparatus, the combination with a furnace, of means for supporting and carrying the ware through the furnace and stationary frictional means for rotating it therein, means for lowering it below the furnace-chamber, and power-driven means for rotating it at a higher speed when so lowered, substantially as set forth.

6. In glass-finishing apparatus, the combination with a furnace, of means for supporting and carrying the ware through the furnace and for rotating it therein, means for lowering it below the furnace-chamber, and means for rotating it at a higher speed when so lowered, with means for removing the finished ware, substantially as set forth.

7. In a glass-finishing apparatus, the combination with a furnace, of a carrier provided with rotatable spindles having cups adapted to receive the ware, and inner vertically-movable spindles provided with supporting-bases, substantially as set forth.

8. In glass-finishing apparatus, the combination with a furnace, of a carrier provided with rotatable spindles having cups adapted to receive the ware, inner vertically-movable spindles provided with bases, and means for raising and lowering the ware thereon, substantially as set forth.

9. In glass-finishing apparatus, the combination with a furnace, of a carrier provided with rotatable spindles having cups adapted to receive the ware, inner vertically-movable spindles provided with bases, and means for rotating the spindles and bases, substantially as set forth.

10. In glass-finishing apparatus, the combination with a furnace, of a carrier provided with rotatable spindles having cups adapted to receive the ware, inner vertically-movable spindles provided with bases, means for raising and lowering the inner spindles, with means for rotating both the spindles and the ware, substantially as set forth.

11. In glass-finishing apparatus, the combination with a furnace, of a carrier provided with rotatable spindles having cups adapted to receive the ware, and inner vertically-movable spindles provided with bases adapted to be nested in said cups, substantially as set forth.

12. In glass-finishing apparatus, the combination with a furnace, of a carrier provided with spindles having cups adapted to receive the ware, inner vertically-movable spindles having supporting-bases for the ware, and means for rotating the spindles and bases, substantially as set forth.

13. In glass-finishing apparatus, the combination with a furnace, of a carrier provided with means for raising and rotating the ware within the furnace-chamber, receiving-cups, means for lowering the ware into the cups, and means for rotating it while therein, substantially as set forth.

14. In glass-finishing apparatus the combination with a circularly-arranged furnace, of a carrier provided with spindles having cups adapted to receive the ware, vertically-movable supporting-bases for the ware, friction-wheels secured to the spindles, means for rotating the carrier, and a circular frictional bearing for the wheels, substantially as set forth.

15. In glass-finishing apparatus, the combination with a circularly-arranged furnace, of a carrier provided with spindles having cups adapted to receive the ware, vertically-movable supporting-bases for the ware, friction-wheels secured to the spindles, means for rotating the carrier, a circular frictional bearing for the wheels, and positively-driven means for engaging the spindle-wheels, substantially as set forth.

16. In glass-finishing apparatus, the combination with a circularly-arranged furnace, of a carrier provided with spindles having cups adapted to receive the ware, vertically-movable supporting-bases for the ware, friction-wheels secured to the spindles, means for rotating the carrier, a circular frictional bearing for the wheels, positively-driven means for engaging the spindle-wheels, and means for raising the supporting-bases of the spindles, substantially as set forth.

17. In glass-finishing apparatus, the combination with a circularly-arranged furnace, of a carrier provided with spindles having cups adapted to receive the ware, vertically-movable supporting rods and bases for the ware, friction-wheels secured to the spindles, means for rotating the carrier, a circular frictional bearing for the wheels, positively-driven means for engaging the spindle-wheels, and an undulating cam-track for the base-supporting rods, substantially as set forth.

18. In glass-finishing apparatus, a rotating carrier provided with independently-rotating spindles having receiving-cups, with an inner base and means for lowering and raising the base and ware into and out of the cups, substantially as set forth.

19. In a glass-finishing apparatus, the combination with a furnace, of a carrier provided with means for raising, lowering and rotating the ware, and means for removing the ware from the carrier, substantially as set forth.

20. In a glass-finishing apparatus, the combination with a furnace, of a carrier provided with means for raising, lowering and rotating the ware, and rotating arms adapted to engage the ware and remove it laterally, substantially as set forth.

21. In a glass-finishing apparatus, the combination with a furnace of a carrier provided with means for raising, lowering and rotating the ware, and rotating arms adapted to engage the ware and remove it laterally, with mechanism operated by the carrier for actuating the said arms, substantially as set forth.

In testimony whereof I affix my signature in presence of two witnesses.

JOHN H. CROSKEY.

Witnesses:
JAMES McC. MILLER,
C. M. CLARKE.